United States Patent [15] 3,643,697
Staat et al. [45] Feb. 22, 1972

[54] MIXING VALVE STRUCTURE

[72] Inventors: Aaron A. Staat, 82 Dudley Road; Robert A. Staat, 350 Marmil Circle, both of Fort Mitchell, Ky. 41017

[22] Filed: Feb. 10, 1969

[21] Appl. No.: 797,737

Related U.S. Application Data

[63] Continuation-in-part of Ser. No. 614,098, Feb. 6, 1967, abandoned.

[52] U.S. Cl. ........................................137/625.17, 251/172
[51] Int. Cl. .................................................................F16k 19/00
[58] Field of Search ....................137/625.17, 602, 615, 119, 137/597; 251/214, 231, 172

[56] References Cited

UNITED STATES PATENTS

| 3,378,034 | 4/1968 | Andrews | 137/625.17 |
| 3,490,493 | 1/1970 | Eversman | 137/625.17 |
| 2,847,027 | 8/1958 | Kumpman | 137/625.17 X |
| 2,977,987 | 4/1961 | Maynard | 251/172 X |
| 2,987,079 | 6/1961 | Page | 137/625.17 |
| 3,118,650 | 1/1964 | Cooper et al. | 251/172 |
| 3,202,181 | 8/1965 | West | 137/625.17 |

Primary Examiner—William R. Cline
Attorney—Pearce and Schaeperklaus

[57] ABSTRACT

A valve including an outer casing having a pair of inlets, an outlet and a cup-shaped recess formed therein. A valve chamber cartridge is removably received in the recess, the cartridge including a body having a pair of end surfaces and a valve chamber formed in the body extending from one of the end surfaces. A pair of inlet passages are formed in the body of each of which has one end communicating with the valve chamber and its other end communicating with an exterior surface of the cartridge body. Ports in the casing connect each of the inlet passages with one of the pair of inlets, and a slide valve member is received in the valve chamber for controlling communication between the pair of inlets and the outlet through the inlet passages.

23 Claims, 39 Drawing Figures

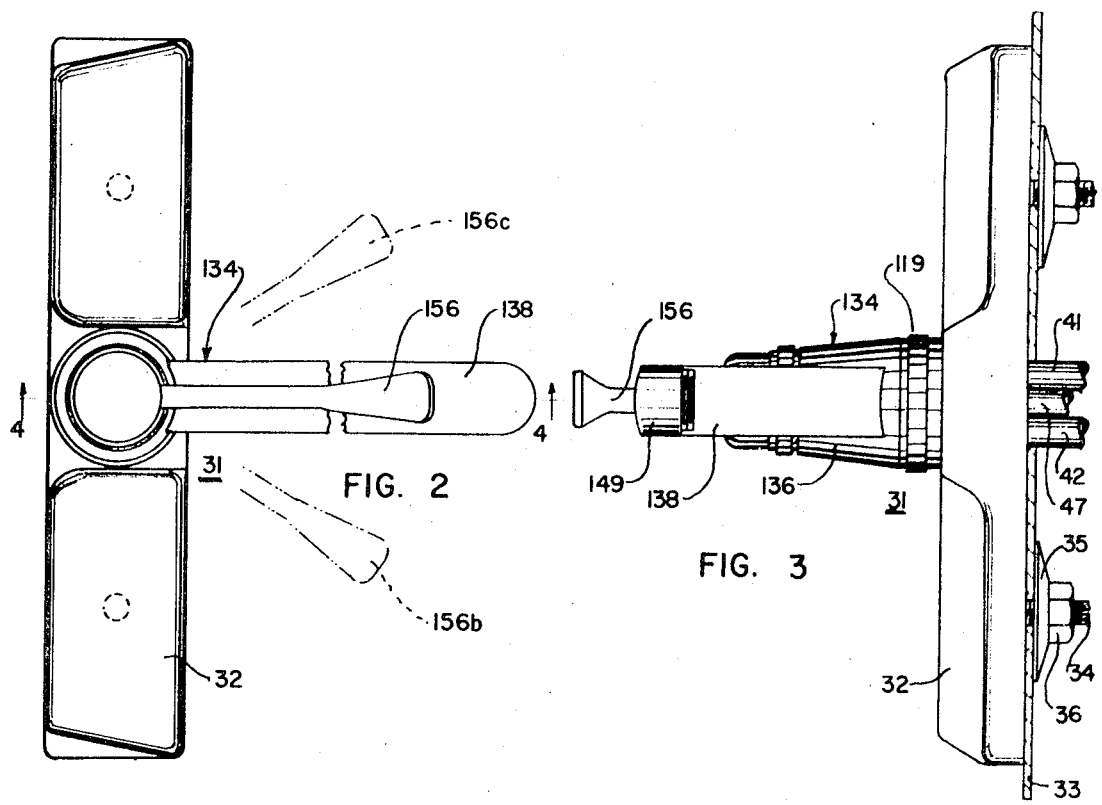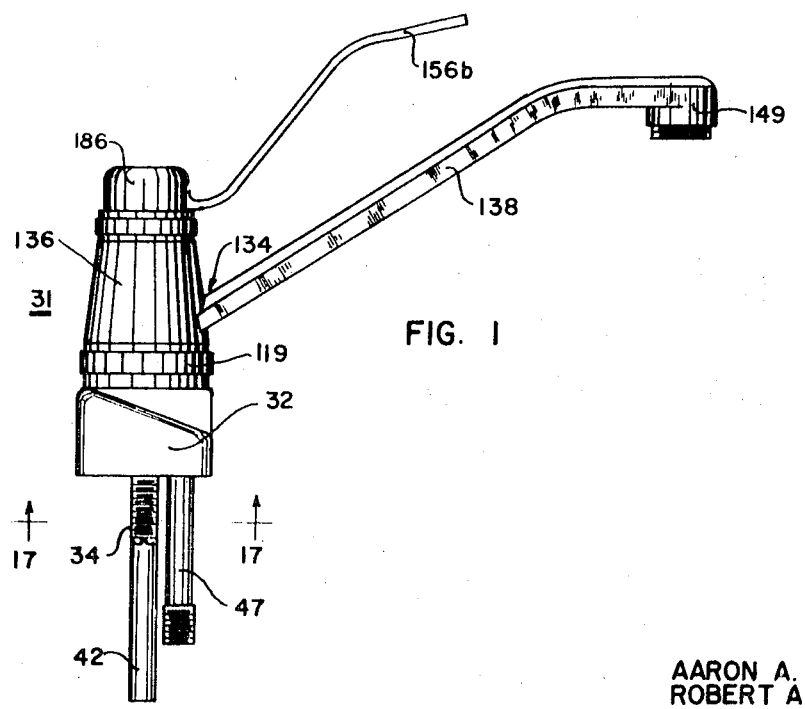

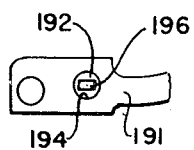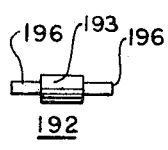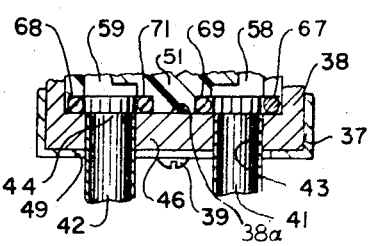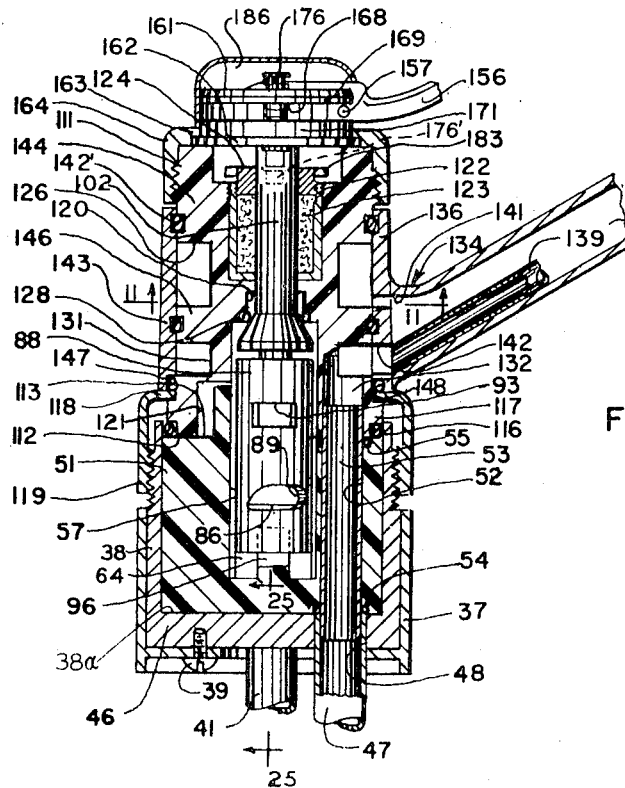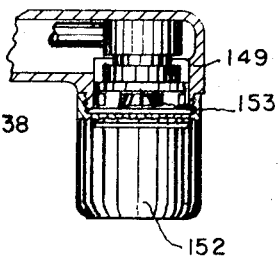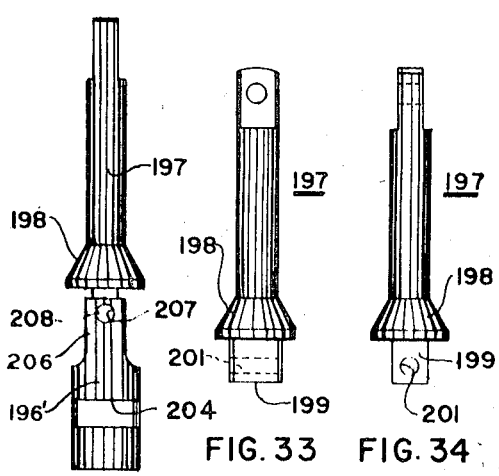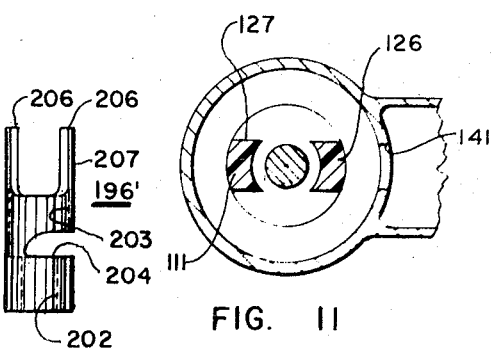
INVENTORS
AARON A. STAAT
ROBERT A. STAAT
BY Barnard, McGlynn & Reising
Attorneys

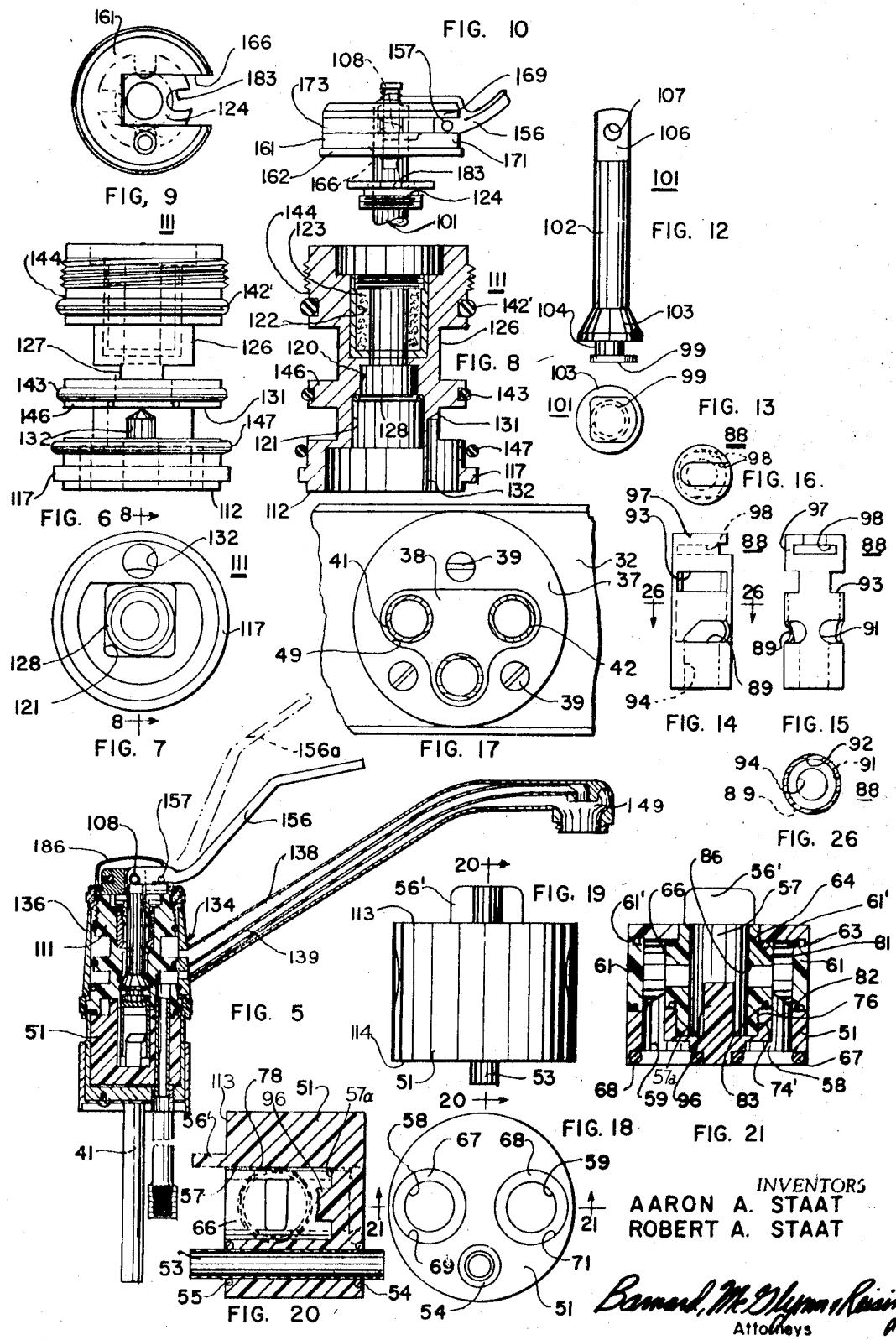

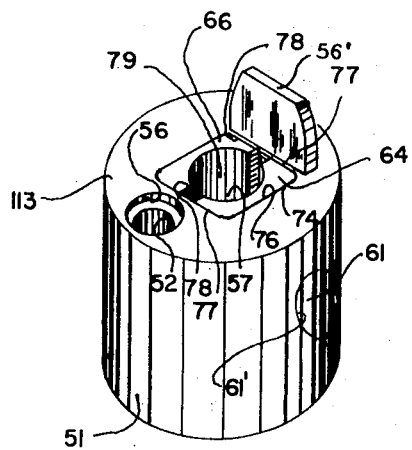
FIG. 22
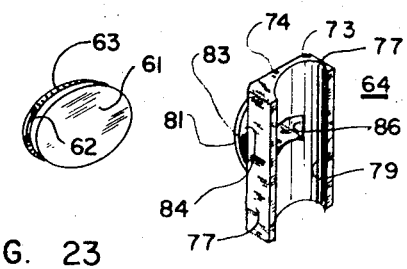
FIG. 23   FIG. 24
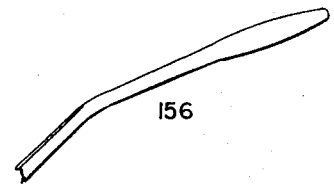
FIG. 27
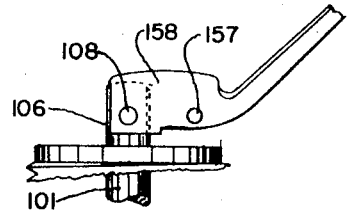
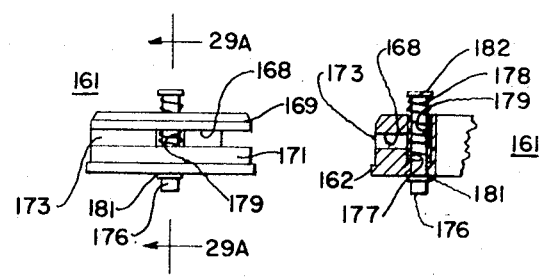
FIG. 29   FIG. 29A
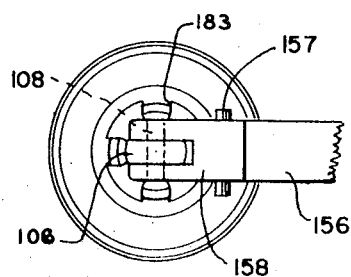
FIG. 28
INVENTORS
AARON A. STAAT
ROBERT A. STAAT
Attorneys

MIXING VALVE STRUCTURE

This application is a continuation-in-part of application Ser. No. 614,098 filed Feb. 6, 1967, and now abandoned, the entire disclosure of which is incorporated herein by reference.

This invention relates generally to valves, and is particularly concerned with valves for mixing hot and cold water in which both the total quantity of waterflow per unit of time as well as the proportion of flow from separate hot and cold water inlets is controlled by rotational and axial adjustment of a slide valve member relative to the inlets, such valves being particularly suitable for incorporation into faucets of the type commonly referred to as single lever faucets.

In such valves, the slide valve member us usually slidably and rotatably received in a chamber or cavity having hot and cold water inlet ports. The slide valve member may be provided with one or more ports that can be brought into registry with the hot and cold water inlet ports to thereby permit flow from the inlet ports. The valve member is moved to the appropriate level relative to the hot and cold water inlet ports by slidably reciprocating the slide valve member along its axis of rotation, and the valve ports are brought into registry with one or both of the hot and cold water inlet ports by rotating the valve about the same axis when it is at the desired level. The position of the slide valve member along the axis thus determines the amount of the valve ports exposed, or capable of being exposed, to the inlet ports, and the angular position of the slide valve member relative to the axis determines the proportionate amount of flow from the hot and cold water inlet ports. Thus, for example, if the angular position of the slide valve member is such that equal amounts of hot and cold water are permitted to flow from the inlet ports, the total rate of flow from both inlet ports can be varied by axial adjustment or reciprocation of the slide valve member.

Presently available valves for single lever faucets are of expensive and complex constructions in order to meet the severe demands placed on these valves during operation. For example, the valve parts are exposed to pressures from both the hot and cold water inlets. These pressures act directly on the slide valve member and are frequently unbalanced, depending upon the position of the slide valve member. It is difficult to maintain a proper seal between the valve and the inlet ports under these conditions. If adequate sealing is not maintained, resulting in leakage from the inlet ports, the temperature control of water discharged from the faucet is thus reduced, and will ultimately be reduced to an unacceptable level. When this occurs, the repair and replacement of the affected parts is usually difficult and expensive. The disassembly, removal and replacement of parts is a particularly difficult and annoying task for persons not familiar with the valve construction and not having proper tools. Even though the leakage problem has in some instances been reduced by the employment of expensive metals with low sensitivity to the range temperature encountered in these valves, and by machining the parts to close tolerances, the initial cost, as well as the cost of replacement and repair is correspondingly increased.

Another frequently recurring problem is that of leakage past the valve operating stem for this type of valve, and of faucet valves in general. Sealing members such as O-rings and compressible packing material will inevitably become defective as a seal after an extended period of use. In order to repair the leak, it is now necessary to at least partially disassemble the faucet and valve sufficiently to remove and replace the sealing member. Again, without proper tools and familiarity with the construction, this can be a difficult and annoying task. As the demand for single lever faucets increases for a wide variety of applications including kitchen sink faucets with and without spray nozzle attachments, and tub and shower faucets, it becomes more and more desirable to increase the number of parts of the valve that can be interchanged in these various types of faucets to reduce the cost of manufacture and of the replacement of parts. Since various flow paths for the water are required in these different types of faucets, it has heretofore been difficult to provide wide interchangeability of parts.

It is therefore one of the objects of this invention to provide a valve construction suitable for use in a variety of single lever faucets including kitchen sink faucets with and without spray attachments, tub faucets, and combined tub and shower faucets, wherein most of the valve parts can be interchangeably employed in the various faucets.

Another object is to provide a valve for use in single lever faucets for discharging a mixture of water from hot and cold water inlets upon manipulation of a slide valve member wherein the likelihood of leakage from the hot and cold water inlets is substantially reduced.

A still further object is to provide a valve in which the density of packing material surrounding a valve operating member can be selectively adjusted solely by manipulation of one or more of the valve parts without requiring any tools for the adjustment.

Another object lies in the provision of a valve chamber cartridge adapted to be removably received in a valve casing for providing passageways for conducting fluid flow through the valve casing wherein the cartridge is formed with inlet passages for hot and cold water, a valve chamber for slidably and rotatably receiving a slide valve member and capable of providing alternate flow paths between the inlets and the outlet or outlets of the valve.

Another object of this invention is to provide a single-lever valve in which a slide valve element controlling flow from hot and cold water inlet ports is restrained against movement from the central axis of the valve chamber receiving the slide valve member to reduce the likelihood of leakage caused by unbalanced pressure acting on the valve element.

A further object is to provide a single-lever valve in which the valve element controlling communication between the hot and cold inlet ports and the mixing chamber is maintained in sealing relationship against valve seats surrounding the ports partially by the fluid pressure acting on the valve seats from the inlet ports.

Still another object is to provide an inner housing or valve chamber cartridge that can be removably received in a valve casing for providing passageways for fluid flow through the casing and can be interchangeably mounted in a variety of hot and cold water mixing valves having different flow paths and alternate applications.

Still another object is to provide a valve having an inlet and an outlet with a valve element for controlling communication between the inlet and outlet in which an operating stem for the valve element is surrounded by a packing chamber having an adjustable member for varying the volume of the packing chamber and thereby adjusting the density of the packing material contained therein in which means are provided for selectively engaging the operating member with the adjusting member to cause movement of the adjusting member in response to movement of the operating member to thereby adjust the density of the packing material contained in the packing chamber without the use of tools.

Yet another object is to provide a valve of this type in which flow of the liquid is controlled by a hollow cylindrical slide valve member having ports for receiving discharged liquid therethrough.

A further object of this invention is to provide a valve of this type in which liquid from the slide valve member is discharged through a spool member which channels the liquid into a spout.

In carrying out the foregoing, and other objects, a valve according to the present invention includes a valve chamber cartridge adapted to be removably inserted into a valve casing for providing passageways for conducting fluid flow through the casing, the cartridge comprises a body formed with a pair of spaced end surfaces with a valve chamber communicating with one of the end surfaces. A pair of inlet passages are formed in the body each having one end communicating with the valve chamber and its other end communicating with an exterior surface of the body. Means are provided in the valve chamber defining a pair of valve seats each surrounding the end of the inlet passage.

In the preferred embodiment, the cartridge comprises a molded plastic cylindrical body having planar end surfaces and an axial valve chamber extending from one of the end surfaces with an end wall spaced from the other end surface. A pair of inlet passages are formed in the body each having one end communicating with the valve chamber and its other end opening onto said other end surface. An integral valve guide stem projects axially from the end wall of the valve chamber, and at least one auxiliary passage is formed in the body extending between the end surfaces unconnected with the valve chamber and inlet passages. The valve chamber is of rectangular cross section, and an integral handle tongue projects from said one end surface to assist in removing and inserting the cartridge in a valve casing.

Finally, this invention provides a mixing faucet or valve which includes a housing having a central cavity in which a hollow cylindrical slide valve member reciprocates axially and turns about the axis thereof. Radial inlet slots in the slide valve member receive fluid from transverse inlet openings in the housing. Sliding seat members mounted in the inlet openings engage the slide valve member. Pressure of fluid in inlet cavities of the housing urges the sliding seat members into engagement with the slide valve member. The housing is removably mounted in a hollow outer casing through which inlet lines communicate with the inlet cavities of the housing. The interior of the slide valve member communicates with the interior of a spool member which distributes mixed fluids to a spout.

Other objects, advantages and features of the invention will be apparent to those skilled in the art from the following description taken in connection with the accompanying drawings in which:

FIG. 1 is a view in side elevation of a mixing valve constructed in accordance with an embodiment of this invention;

FIG. 2 is a plan view thereof;

FIG. 3 is a view in front elevation thereof, nuts and washers being shown on mounting studs thereof, a support therefor being shown in section;

FIG. 4 is a view in section taken on line 4—4 in FIG. 2 on an enlarged scale, an aerator being shown in association therewith;

FIG. 5 is another view in section taken on the same line as FIG. 4, an operating lever thereof being shown in valve open position in dot-dash lines;

FIG. 6 is a view in side elevation of a spool member forming a part of the mixing valve, O-ring seals being shown in association therewith;

FIG. 7 is a bottom plan view of the spool member illustrated in FIG. 6;

FIG. 8 is a view in section taken on the line 8—8 in FIG. 7;

FIG. 9 is a plan view of a fulcrum supporting member which forms a part of the valve structure, a packing gland being shown in association therewith in dotted lines;

FIG. 10 is a fragmentary exploded view in side elevation of the fulcrum supporting member with a fragmentary portion of an operating lever, a fragmentary portion of a valve operating link in a packing gland nut being shown in association therewith.

FIG. 11 is a view in section taken on the line 11—11 in FIG. 4;

FIG. 12 is a view in side elevation of the valve operating link;

FIG. 13 is a bottom plan view of the valve operating link illustrated in FIG. 12;

FIG. 14 is a view in side elevation of a slide valve member forming a part of the valve assembly;

FIG. 15 is a view in front elevation of the slide valve member illustrated in FIG. 14;

FIG. 16 is a plan view of the slide valve member illustrated in FIGS. 14 and 15;

FIG. 17 is a view in section taken on the line 17—17 in FIG. 1;

FIG. 18 is a bottom plan view of an inner valve housing or valve chamber cartridge forming a part of the mixing valve;

FIG. 19 is a view in front elevation of the inner housing shown in FIG. 18;

FIG. 20 is a view in section taken on the line 20—20 in FIG. 19;

FIG. 21 is a view in section taken on the line 21—21 in FIG. 18;

FIG. 22 is a perspective view of the inner valve housing or cartridge with the sealing plugs and sliding seat members in position;

FIG. 23 is a perspective view of one of the sealing plug members, a seal ring being mounted thereon;

FIG. 24 is a perspective view of one of the hollow sliding seat members;

FIG. 25 is a fragmentary view in section taken on the line 25—25 in FIG. 4;

FIG. 26 is a view in section taken on the line 26—26 in FIG. 14;

FIG. 27 is a fragmentary view in side elevation of an assembly of handle member, spool member and valve operating link with other parts removed for clarity;

FIG. 28 is a plan view of the assembly shown in FIG. 27;

FIG. 29 is a view in side elevation of a fulcrum member;

FIG. 29A is a view in section taken on the line 29A—29A in FIG. 29;

FIG. 30 is a fragmentary view in side elevation of an operating handle constructed in accordance with another embodiment of this invention;

FIG. 31 is a plan view of a fulcrum pin of a handle lever shown in FIG. 30;

FIG. 32 is a fragmentary plan view of a handle and fulcrum pin illustrated in FIG. 30;

FIG. 33 is a view in side elevation of a valve operating link forming a portion of a mixing valve constructed in accordance with another embodiment of this invention;

FIG. 34 is a view in front elevation of the valve operating link illustrated in FIG. 33;

FIG. 35 is a view in side elevation of a slide valve member of the embodiment employing the valve operating link of FIGS. 33 and 34;

FIG. 36 is a view in front elevation showing the valve operating link and slide valve member of FIGS. 33 to 35 in assembled relationship;

Figure 37:
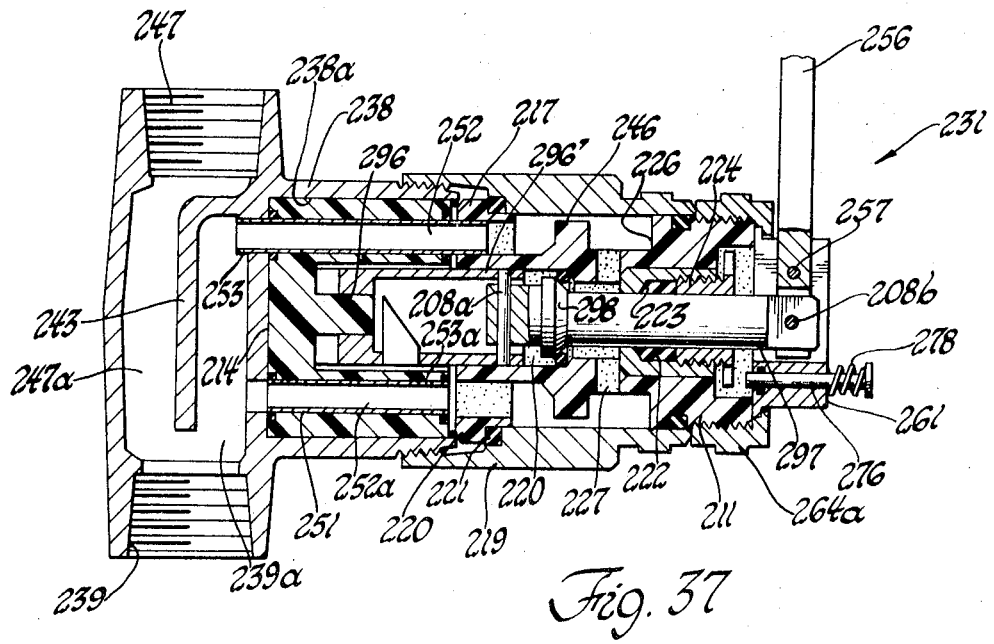
FIG. 37 is a sectional view of a modification of the invention embodied in a tub and shower faucet.

In FIGS. 1 to 3, inclusive, is shown a mixing valve 31 constructed in accordance with an embodiment of this invention. The mixing valve includes an outer shell 32 which can be mounted on an appropriate support 33. Studs 34 (FIGS. 1 and 3) attached to the shell 32 carry washers 35 and nuts 36 for use in mounting the shell.

The shell 32 includes a central socket or well 37 (FIGS. 17 and 4) in which an outer cup-shaped housing 38 defining a recess 38a (FIGS. 4 and 25) is mounted. Screw fasteners 39 hold the outer cup-shaped housing 38 in position in the well 37. Hot and cold water inlet lines 41 and 42 (FIGS. 25) extend into sockets 43 and 44, respectively, in a bottom wall 46 of the outer housing 38. A spray line 47 (FIG. 4) extends into a socket 48 in the bottom or end wall 46. The lines 41, 42 and 47 can be attached to the bottom wall 46 in watertight relation by brazing or soldering or the like. The lines 41, 42 and 47 extend through a slot 49 (FIG. 17) in the well 37.

An inner valve housing or valve chamber cartridge 51 is mounted inside the outer housing 38. Details of construction of the inner housing or valve chamber cartridge 51 are shown in FIGS. 18 to 22, inclusive. The cartridge or inner housing can be formed as substantially a cylinder of substantially rigid but resilient plastic material such as that commonly called Noryl and manufactured by General Electric Company, or can be made of noncorroding metal such as brass or the like. An upright bore or auxiliary passage 52 (FIG. 4) in the inner housing 51 receives a metal tube 53 which communicates with the spray line 47. O-ring seals 54 and 55 are located at upper and lower ends of the inner housing 51 surrounding the tube 53, the seal 55 being received in a slot 56 in the inner housing, best shown in FIG. 22, surrounding the upper end of the bore 52 and the seal 54 being received in a similar slot at the lower end of the bore 52. An integral handle tongue 56' is provided at an upper end of the cartridge or inner housing 51 for use in handling same. The cartridge can readily be lifted free for servicing or replacing. The metal tube 53, by registry with the spray line 47, insures proper alignment of the cartridge or inner housing 51 in the outer housing 38.

An inner well, cavity or valve chamber 57 is provided inside the inner housing or cartridge 51. The valve chamber 57 communicates with hot and cold water inlet passages or cavities 58 and 59, as shown in FIG. 21. Each of the cavities 58 and 59 is generally T-shaped. Sealing plugs 61 close outwardly extending portions 61' of crossbar sections thereof. As shown in FIG. 23, each plug 61 includes an annular groove 62 in which a sealing O-ring 63 is received. Hollow sealing plug or sliding seat members 64 and 66 are mounted in inner portions of the crossbar sections of the hot and cold water cavities 58 and 59, respectively. Lower end portions of the cavities 58 and 59 communicate with the hot and cold water inlet lines 41 and 42, respectively, as shown in FIG. 25. O-ring seals 67 and 68 mounted in sockets 69 and 71, respectively, in the lower face or end surface 114 of the inner housing or cartridge 51, as shown in FIG. 18, surround the upper ends of the lines 41 and 42.

Details of construction of the sliding seat member 64 are shown in FIGS. 21 and 24, the other sliding seat member being of similar construction. The sliding seat member 64 includes a body 73 having an upright outer wall 74 which can engage flatwise and end wall 76 of the cavity 57 of the inner housing cartridge 51, upright sidewalls 77 which slidably engage sidewalls 78 of the cavity or valve chamber 57 and an inner cylindrically concave face 79. A guide plug portion 81 extends outwardly from the outer wall 74. As shown in FIG. 21, the guide plug portion 81 is slidably received inside an inner crossbar portion 82 of the hot water passage or cavity 58. An O-ring seal 83 received in a groove 84 surrounding the guide plug portion 81 forms a seal between the sliding seat member 64 and the inner crossbar portion 82 of the hot water inlet passage or cavity 58. A port 86 through the sliding seat member 64 along the axis of the guide plug portion 81 provides communication between the hot water cavity 58 and the inner cavity or valve chamber 57 of the inner housing or cartridge 51. Water pressure inside the hot water cavity 58 urges the sliding seat member 64 inwardly.

Thus, the inner valve housing or valve chamber cartridge comprises a cylindrical body 51 having a pair of end surfaces 113, 114; an axial valve chamber 57 formed in body 51 extending from the end surface 113 toward the end surface 114 and having an end wall 57a spaced from the end surface 114. A pair of inlet passages 58, 59 are formed in body 51 each having one end communicating with the valve chamber 57 and its other end opening onto the end surface 114. Means 64, 66 in the valve chamber 57 defines a valve seat for each of the inlet passages. Valve guide means 96 is provided in the valve chamber or cavity 57, and projects from the end wall 57a for locating and guiding a slide valve member received in the valve chamber 57 relative to the valve seats 64,66. The valve guide means comprises an integral stem 96 projecting from end wall 57a of the cavity toward the end surface 113. In the embodiment of FIGS. 4 and 18 through 21, at least one auxiliary passage 52 is formed in the body 51 which extends between the end surfaces 113 and 114 and is unconnected with the inlet passages 58, 59 and with the valve chamber 57. Furthermore, a tubular member 53 is mounted in the auxiliary passage 52 and projects from the end surface 114 for locating the body 51 in a port in the valve casing. The means 64, 66 defining a valve seat for each of the inlet passages 58 and 59 has an outer face 74 engaged with the cavity wall surrounding the respective inlet passage, and an inner concave face 79 for engagement by the slide valve member and a port 86 communicating with its respective inlet passage. The guide plug portion 81 on each of the seat members projects into its respective inlet passage.

As will be pointed out hereinbelow, the valve chamber cartridge 57 is adapted to be removably received in the outer casing of valve 31 which is made up of the outer housing portion 38, a connecting ring 119, a hollow housing portion 136, and a retaining ring 164.

A hollow slide valve member 88 is received inside the cavity 57, as shown in FIG. 4, the slide valve member 88 being received between the sliding seat members 64 and 66. Details of construction of the slide valve member 88 are shown in FIGS. 14, 15, 16 and 26. The slide valve member 88 is of generally cylindrical shape with the outer wall complementary in shape to the concave faces 79 of the sliding seat members so that, as water pressure in the hot and cold water cavities urges the sliding seat members inwardly, they engage the slide valve member 88 in substantially liquidtight relation.

Inlet openings 89 and 91 in the slide valve member 88 can be brought into registry with the ports 86 of the sealing plug members, as shown in FIG. 4. Water flows through the inlet openings 89 and 91 into the hollow interior 92 (FIG. 26) of the slide valve member and upwardly therethrough, as shown in FIG. 4, to be discharged through ports 93 therein. An upright socket 94 is formed in the lower end of the slide valve member 88 in which a post 96 (FIG. 21), which is a part of the inner housing 51, is received to guide and center the slide valve member.

At the upper end of the slide valve member 88 is provided a transversely slotted head 97 (FIGS. 14 and 15). Received in a slot 98 of the head 97 is the lower end portion 99 (FIG. 12) of a valve operating stem or member in the form of a link or rod 101. Details of construction of the link 101 are shown in FIGS. 12 and 13. The link 101 includes a cylindrical body 102 at the lower end of which is a frustoconic valve sealing portion or head 103. The lower end portion 99 of the valve operating link is mounted on a lower extension 104 thereof. A head 106 at the upper end of the cylindrical body 102 is provided with a transverse bore 107 for receiving a pin 108, as shown in FIG. 10. When the mixing valve is in use, the lower end portion 99 of the valve operating link 101 is received in the slot 98 of the head 97 of the slide valve member 88 so that the slide valve member 88 and the link 101 move together.

The valve operating link 101 moves up and down inside a spool member 111. The flat sides of the lower end portion 99 engage the flat sides of slot 98 to prevent relative rotation between the link and valve. Details of construction of the spool member 111 are shown in FIGS. 6, 7, 8 and 11. The spool member can be formed of substantially rigid but resilient plastic material such as that commonly called Noryl or can be made of noncorroding metal such as brass or the like. A lower end face 112 of the spool member 111 engages flatwise against an upper face or end surface 113 of the valve chamber cartridge 51. An O-ring seal 116 (FIG. 4) forms a seal therebetween. The seal 116 underlies an outwardly extending annular flange 117 on the spool member 111. An inwardly directed flange 118 of a connecting ring 119 overlies the flange 117. The connecting ring 119 is threaded on the outer housing 38 and draws the spool member 111 downwardly against the inner housing or cartridge 51 to hold the spool member 111 and the inner housing 51 in assembled relation with the outer housing 38.

The spool member 111 is provided with an axial cavity 120 through which the link 101 extends, as shown in FIG. 4. The upper portion of the slide valve member 88 extends into an enlarged lower portion 121 of the cavity 120. A cup-shaped packing box or chamber 122 in the upper portion of the spool member 111 holds packing 123 which surrounds the body 102 of the link 101 to form a liquidtight seal therewith but permitting the link to turn about its axis and to move up and down inside the spool member 111. A packing chamber adjustment member in the form of an annular packing gland nut 124, threaded in the upper portion of the packing box 122 serves to selectively increase and decrease the volume of the packing chamber to adjust the compression of the packing 123.

The axial cavity or chamber 120 communicates with an annular slot 126 in the spool member 111 through slots 127 (FIGS. 6 and 11) therein. An O-ring seal 128 is mounted inside the axial cavity 120 below the slots 127. The frustoconic valve sealing portion 103 of the link 101 can engage the O-ring seal 128 to cut off flow from the enlarged lower portion 121 of the axial cavity to the annular slot 126. When the link 101 and the slide valve member 88 are advanced downwardly from the FIG. 4 position, the frustoconic valve sealing portion 103 of the link 101 comes free of the O-ring seal 128, and the valve is open.

An annular slot 131 in the spool member 111 communicates with an upright bore 132 therein. As shown in FIG. 4, the bore 132 receives the upper end of the tube 53 which communicates with the spray line 47.

A spout assembly 134 fits over and around the spool member 111. The spout assembly includes a hollow housing portion 136, which fits around the spool member, and an outwardly extending hollow spout portion 138 extending outwardly from the hollow housing portion 136. A spray return line 139 extends lengthwise of an inside the spout portion 138. As shown in FIG. 4, the annular slot 126 of the spool member 111 communicates with the interior of the spout portion 138 through an opening 141 in the housing portion 136. The annular slot 131 of the spool member 111 communicates with the interior of the spray return line 139 through an opening 142 in the housing portion 136.

Seals are formed between the spool member 111 and the hollow housing portion 136 above and below the annular slots 126 and 131 by O-ring seals 142' and 143 mounted on ribs 144 and 146, respectively, of the spool member 111 and an O-ring seal 147 mounted in a socket 148 in the hollow housing portion 136. At the outer end of the spout portion 138 is provided a discharge elbow 149 having external threads on which an aerator 152 (FIG. 4) can be mounted. A diverter fitting 153 can be mounted in the discharge elbow, and the diverter fitting 153 can be constructed to divert water from the spout portion 138 back through the spray return line 139 when a spray head (not shown) connected to the spray line 47 is open. The faucet spout assembly 134 can swing or pivot about the spool member 111 as desired with the openings 141 and 142 remaining in communication with the annular slots 126 and 131, respectively, in all positions.

The link 101 and the slide valve member 88 are moved up and down and turned by means of an operating handle or lever 156. As the handle 156 is swung from the full-line position of FIG. 5 to the dot-dash line position indicated at 156a, the handle 156 swings about a fulcrum pin 157 mounted therein. As shown in FIG. 28, end portions of the fulcrum pin extend outwardly from the handle 156. A head end 158 of the handle 156 is bifurcated to receive the head 106 of the link 101. The pin 108, as shown in FIG. 27, pivotally connects the head 106 to the bifurcated head end 158 of the handle 156.

The fulcrum pin 157 is supported by a generally cylindrical fulcrum member or disk 161 which is mounted at the upper end of the spool member 111, as shown in FIG. 4. An outwardly extending flange 162 on the fulcrum member 161 is engaged by an inwardly directed flange 163 of a retaining ring 164. The retaining ring 164 is threaded to the spool member 111 and holds the fulcrum member 161 in position thereon. However, the fulcrum member can turn about the axis of the spool member 111. As shown in FIG. 9, the fulcrum member has a diametrically extending slot 166 in which the head end 158 (FIG. 28) of the handle 156 is received. A circumferential slot 168 is formed in the fulcrum member and, as shown in FIG. 29, upper and lower teeth 169 and 171 are formed where the diametrical and circumferential slots intersect. As shown in FIG. 10, the fulcrum pin 157 is received between the teeth 169 and 171 so that, as the handle 156 is raised and lowered, the fulcrum pin can move radially of the fulcrum member 161.

The portion of the circumferential slot 168 remote from the teeth 169 and 171 can be filled with a C-shaped plug 173.

An upright pin 176 is slidably mounted in a bore 177 (FIG. 29A) in the fulcrum member. A compression spring 178 is mounted in a counterbore 179 surrounding the pin 176 and urges the pin 176 to the position shown in FIG. 29A in which a collar 181 on the pin 176 engages the underside of the fulcrum member 161. The compression spring 178 bears on a cap 182 mounted on the upper end of the pin 176. The pin 176 can be pushed downwardly to the position shown in dot-dash lines at 176' in FIG. 4 at which the lower end of the pin can be received in one of a plurality of slots 183 in the packing gland nut 124. When the pin is so received and the handle 156 is pivoted or swung about the axis of the link 101, the packing gland nut 124 is turned thereby to adjust the compression in the packing 123. A hollow closure cap 186 of inverted cup shape is mounted on the fulcrum member 161 in frictional engagement therewith to cover the fulcrum member and prevent inadvertent operation of the pin 176.

When the handle 156 is in lowered position, the frustoconic portion 103 of the link 101 engages the O-ring seal 128 to close the valve. As the handle 156 is raised, the link 101 moves downwardly free of the seal 128, and the slide valve member 88 moves downwardly therewith to bring the inlet openings 89 and 91 into registry with the ports 86 of the sliding seat members 64 and 66. Water flows from the hot and cold water inlet lines 41 and 42 through the hot and cold water cavities 58 and 59 and the ports 86 in the sliding seat members 64 and 66 and the inlet openings 89 and 91 into the hollow interior 92 of the slide valve member 88 and therefrom through the ports 93 therein to the axial cavity 120 of the spool member 111 and outwardly therefrom through the slots 127 to the annular slot 126 and therefrom through the opening 141 into the hollow spout portion 138. Water pressure in the hot and cold water cavities 58 and 59 urges the sliding seat members 64 and 66 into firm engagement with the slide valve member 88 to form seals therebetween. As the handle 156 is swung from the full-line position of FIG. 2 toward the dot-dash line positions 156b and 156c, the ratio of hot to cold water is varied. As shown in FIG. 14, lower portions of the inlet openings 89 and 91 in the slide valve member 88 are wider than upper portions thereof to provide a wide opening and minimize frictional effects at low-flow rates.

When servicing of the lower portion of the valve is required, the connecting ring 119 can be loosened and the spool member 111, the spout assembly 134, and other upper parts of the valve can be removed providing ready access to the inner housing 51.

The valve 31 thus comprises an inlet 41 (or 42) and an outlet 141, and valve member 88 for controlling communication between inlet 41 and outlet 141, and an operating member 102 connected with valve member 88 and being selectively movable for adjusting valve 88, means 122 defining a packing chamber surrounding a portion of the operating member, a packing chamber adjustment member 124 selectively movable to vary the volume of the packing chamber and thereby adjust the density of sealing material contained therein, and means 176 for selectively engaging the operating member 102 with the adjusting member 124 to cause movement of the adjusting member in response to movement of the operating member. Means 176 comprises a pin carried by the operating member for movement between a retracted position (the full line position of FIG. 4) in which it is held out of engagement with the adjustment member 124 during movement of the operating member 102, and an extended position (the dotted line position of FIG. 4) in which it is engageable with the adjustment member 124 during movement of the operating member to thereby vary the volume of the packing chamber.

In FIGS. 30 and 32 are shown an operating handle 191 having a fulcrum pin 192 of revised construction. The fulcrum pin 192 (FIG. 31) has a cylindrical body 193 which is pivotally mounted in a bore 194 (FIG. 30) in the handle 191. Rectangular heads 196 extend in opposite directions from the body 193.

The handle 191 and the fulcrum pin 192 can be assembled with other elements of the construction described hereinabove, and the head ends of the fulcrum pin can be slidably received between teeth 169 and 171 of the fulcrum support member 161 with the handle 191 pivoting about the fulcrum pin with the head ends of the fulcrum pin being substantially nonrotatably received between the teeth of the fulcrum support member.

In FIGS. 33 through 36 are shown a slide valve member 196' and a valve operating line 197 of revised construction. The upper portion of the link 197, as shown in FIGS. 33 and 34, is similar to the link already described, but below a frustoconic valve sealing portion 198 is formed a boss 199 having a transverse bore 201. The slide valve member 196 is of generally cylindrical construction having a central bore 202 and a counterbore 203 in the upper portion thereof. A single transverse slot 204 intersects the counterbore 203. Upwardly extending arms 206 are provided with transverse bores 207 which are aligned with the transverse bore 201 in the boss 199 and receive a pin 208 (FIG. 36) to connect the slide valve member 196' and the link 197 together. The assembly of the slide valve member 196' and the link 197 can be assembled with other elements of the construction described hereinabove, and the single transverse slot 204 of the slide valve member 196' can be aligned with ports 86 of either or both sealing plug members 64 and 66. Water is discharged below the frustoconic valve sealing portion 198 between the arms 206.

Figure 38:
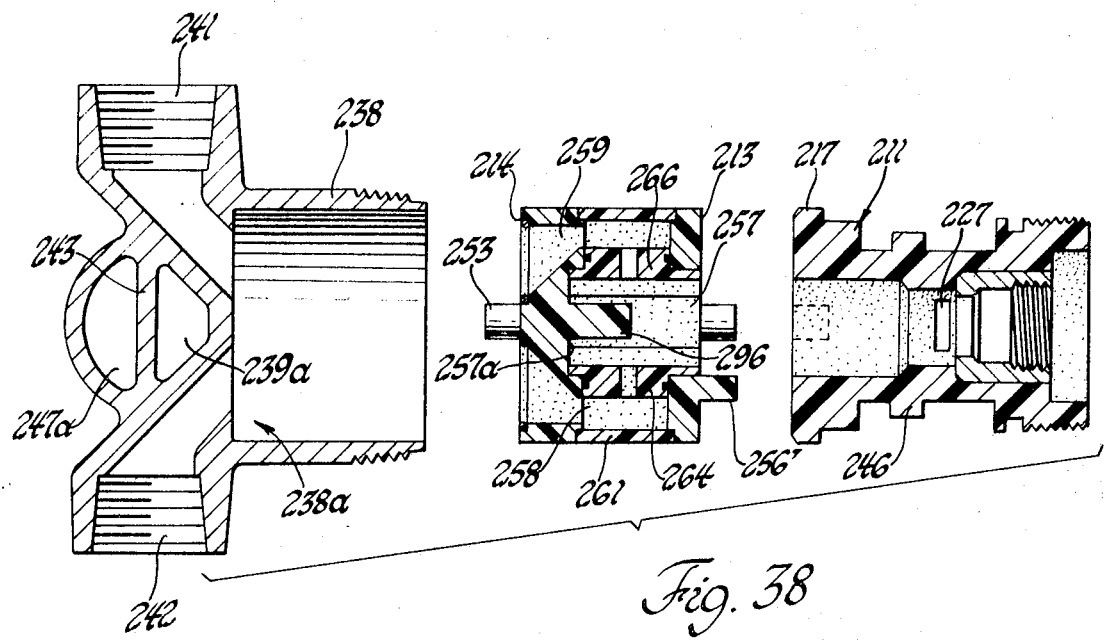
FIG. 38 is an exploded sectional view of a portion of the embodiment of FIG. 37 taken at right angles to FIG. 37.

FIGS. 37 and 38 illustrate a valve according to this invention suitable for use with a combined tub and shower faucet. Valve 231 of FIG. 37 includes an outer casing made up of an outer housing portion 238 formed with a recess 238a, a hollow housing portion 219 threaded onto the housing portion 238, and a retaining ring 264a.

As in the preceding embodiment, valve 231 includes a valve chamber cartridge 251 removably received in the valve casing for providing passageways for conducting fluid flow through the casing, cartridge 251 comprising a body having a pair of spaced end surfaces 213 and 214, a valve chamber 257 in the body communicating with end surface 213, a pair of inlet passages 258, 259 in the body each having one end communicating with valve chamber 257 and its other end communicating with an exterior surface 214 of the cartridge body, and means 264, 266 (identical to members 64, 66 of the preceding embodiment) in the valve chamber defining a pair of valve seats each surrounding said one end of the inlet passages. The body is cylindrical and the inlet passages open onto the end surface 214. Valve guide means 296 projects from the end wall 257a of the valve chamber 257 for locating and guiding a slide valve member relative to the valve seats, the valve guide means comprising an integral stem formed on the cartridge 251.

The valve chamber cartridge body further includes auxiliary passages 252 and 252a extending between the planar end surfaces 213 and 214, the auxiliary passages being unconnected with valve chamber 257 and the inlet passages 258 and 259. Tubular members 253 and 253a are respectively mounted in passages 252 and 252a, and the tubular member 253 projects from the end surface 214 of the cartridge body to provide locating means for orienting the cartridge body in the recess 238a by insertion of the projecting portion of tubular member 253 in a properly sized port in the end wall of recess 238a as shown in FIG. 37. The valve chamber cartridge or inner valve housing 251 further includes an integral handle tongue 256', and is of substantially identical construction to the valve chamber cartridge or inner valve housing 251 previously described except for the provision of two auxiliary passages.

The casing portion 238 includes hot and cold water inlets 241 and 242 (FIG. 38), and a tub outlet 239 and shower outlet 247 (FIG. 37) projecting at right angles from the inlets 241 and 242. The ports in the end wall of recess 238a in registry with the auxiliary passages 252 and 252a communicate with a chamber 239a which is in communication with the tub outlet 239 and is separated from a chamber 247a in open communication by a partition 243. Thus if the tub faucet valve controlling flow from outlet 239 is in its open position, any water flowing from auxiliary passages 252 and 252a will be discharged through outlet 239. On the other hand, if flow from outlet 247 is unrestricted and flow from outlet 239 is shut off, any water flowing from passages 252 and 252a will be discharged through outlet 247.

The inlet ports 241 and 242 are in respective communication with the inlet passages 259 and 258 of the valve chamber cartridge 251, and a slide valve member 296' (similar to the slide valve member 196' of FIG. 36) is received in valve chamber 257 for controlling flow from the inlet passages 258 and 259, or for controlling communication between the pair of inlets 241, 242 and outlets 239, 247 through the inlet passages 259 and 258.

The valve 231 further includes a spool member 211 received in the outer casing with an end face seated against the end surface 213 of the cartridge body; and an operating member in the form of a link or rod 297 (similar to link 197 of FIG. 36) connected with the slide valve member (by pin 208a) and mounted in the spool member 211 for axially slidable and rotatable movement relative to the spool member to cause axially slidable movement of the slide valve member toward and away from the end wall 257a of valve chamber 257 and rotatable movement in the valve chamber, respectively. An axial chamber 220 in the spool member 211 communicates with the valve chamber 257, and slot means 226, 227 provides communication between the axial chamber 220 and outlets 239, 247 around rib 246 of spool member 211 and through auxiliary passages 252, 252a. A valve seat is defined in the axial chamber 220 which is surrounded by an O-ring (in similar fashion to the O-ring 128 in FIG. 4), and a valve head 298 on the operating member 297 is movable between open and closed positions relative to the valve seat upon axial movement of the operating member for controlling flow from the axial chamber 220 through slots 226 and 227. The slots include radial slots 227 in the spool member communicating with a circumferential slot 226. Spool member 211 further includes an outwardly extending flange 217 engaged by a shoulder formed on casing portion 219, and openings or bores in the flange 217 communicate with the respective auxiliary passages 252 and 252a. The tubular member 253 also projects from the end surface 213 of the valve chamber cartridge 251 and is received in the respective opening in flange 217 to maintain the spool member and cartridge 251 in proper orientation or registry. An O-ring is interposed between the opposed end faces of the spool member and cartridge similarly to the O-ring 116 in FIG. 4. A sealing member 221 is interposed between the shoulder of casing portion 219 and flange 217.

Valve 231, similarly to valve 31, further comprises an inlet means 241, 242 and outlet means 239, 247; a valve member 296' for controlling communication between the inlet means and outlet means, an operating member 297 connected with the valve member, said operating member being selectively movable for adjusting the valve member, means 222 defining a packing chamber surrounding a portion of the operating member and adapted to receive sealing material 223; a packing chamber adjustment member 224 selectively movable to vary the volume of the packing chamber and thereby adjust the density of the sealing material contained therein, and means 276 for selectively engaging the operating member with the adjusting member to cause movement of the adjusting member in response to movement of the operating member. The means for engaging the operating member with the adjusting member comprises a pin 276 carried by the operating member for movement between a retracted position in which it is held out of engagement with the adjustment member 224 during movement of the operating member 297, and an extended position in which it is engageable with slots (identical to slots 183 in FIG. 9) in the adjustment member during movement of the operating member to thereby vary the volume of the packing chamber.

As in the FIG. 4 embodiment, the pin 276 is mounted in a disk 261 which is in turn, by handle 256, rotatable with operating member 297. Adjustment member 274 is similar to adjustment member 124 of the previous embodiment and is rotatable to vary the volume of the packing chamber and is provided with slots for engagement with pin 276. Pin 276 is biased to its retracted position by a spring 278.

An operating handle 256 is connected with the operating member 297 in a similar manner to the connection of operating handle 156 with the operating member 101 of the previous embodiment. Disk 261 is of identical construction to disk 161 and a pin 257 provides the fulcrum action for handle 256 in the same manner as the corresponding pin 157 in the previous embodiment.

When the handle 256 is in the position shown in FIG. 37, the frustoconical valve head 298 engages the O-ring in the axial chamber 220 to prevent any flow from the axial chamber 220. Clockwise movement of handle 256 causes the operating member 297 to move axially toward the valve chamber cartridge end wall 257a to connect the axial chamber 220 with slots 226 and 227. The slide valve member 296' also moves axially toward the end wall 257a, and when its port is brought into registry with the ports of the valve seat members 264 and 266, water flows from the inlets 241 and 242 through the inlet passages 258 and 259 into the hollow interior of the valve member to the axial cavity 220. From the axial cavity 220, the water flows through slots 227 and 226 and between the outer periphery of rib 246 and the inner wall of casing portion 219 to the auxiliary passages 252 and 252a. From the auxiliary passages 252 and 252a, the water is discharged through one of the outlets 239 and 247 as previously described.

While specific forms of the invention have been illustrated and described in the foregoing specification and accompanying drawings, it should be understood that the invention is not limited to the exact construction shown, but that various alterations and modifications in the construction and arrangement of parts, as well as numerous equivalents, all falling within the scope and spirit of the invention, will be apparent to those skilled in the art.

The embodiments of the invention in which an exclusive property or privilege is claimed are defined as follows:

1. A valve comprising: an outer casing having a pair of inlets, at least one outlet, and a cup-shaped recess formed therein; a valve chamber cartridge removably received in said recess, said cartridge including a body having a pair of end surfaces, a valve chamber in said body extending from one of said end surfaces, a pair of inlet passages in said body each having one end communicating with said valve chamber and its other end communicating with the other of said end surfaces of said body; ports in said casing connecting each of said inlet passages with one of said pair of inlets, a return port in said outer casing; a second, spray outlet in said outer casing; an auxiliary passage formed in said body for conducting flow between said return port and said spray outlet, and a slide valve member received in said valve chamber operable to control communication between said pair of inlets and said outlet through said inlet passages.

2. A mixing valve which comprises a housing having a central cavity, a hollow cylindrical slide valve member mounted in said central cavity for reciprocation axially and for turning about the axis thereof, there being radial inlet slot means in said slide valve member, a plurality of transverse inlet openings in said housing communicating with said central cavity, a sliding seat member slidably mounted in each of said inlet openings, each sliding seat member having a cylindrically concave face engageable with and complementary to the outer face of the slide valve member, each sliding seat member including a guide plug portion which is mounted in and slidable lengthwise of one of the inlet openings and an enlarged head slidably mounted in the central cavity, the cylindrically concave face being the inner face of said head, there being a port in each sliding seat member providing communication between the inlet opening associated therewith and the inlet slot means in the slide valve, means for introducing liquids under pressure into the inlet openings, the pressure in the inlet openings urging the sliding seat members into engagement with the slide valve, means for reciprocating and turning the slide valve to bring selected portions of the inlet slot means into registry with the ports, whereby the liquids flow into the interior of the slide valve member and mix therein, and means for withdrawing mixed liquids from the interior of the slide valve member.

3. A mixing valve in accordance with claim 2 characterized by the fact that a circumferential slot is formed in the guide plug portion of each sliding seat and that a resilient sealing ring is mounted in said circumferential slot and engages the interior of the inlet opening associated therewith to form a sliding seal therebetween.

4. A mixing valve as in claim 2 wherein the means for withdrawing mixed liquids from the slide valve member is spaced from the inlet slot means and outside the housing, a hollow spool member overlies the housing, the withdrawing means discharges into the hollow interior thereof, and there is a port in the spool member for withdrawing the mixed liquids.

5. A mixing valve in accordance with claim 4 wherein the means for reciprocating and turning the slide valve member is a link rod having a portion extending axially of the spool member, there is a sealing ring in the spool member ahead of the port therein, and the link rod has a frustoconic section engageable with said sealing ring when the valve is in a closed position to prevent outward flow of liquids.

6. A mixing valve which comprises a hollow casing, a housing removably mounted inside said casing, said housing having a central cavity, a hollow cylindrical slide valve member mounted in said central cavity for reciprocation axially and for turning about the axis thereof, there being a radial inlet slot means in said slide valve member, a plurality of transverse inlet openings in said housing communicating with said central cavity, inlet lines attached to said casing and communicating with the inlet openings of the housing, a sliding seat member mounted in each of said inlet openings, each sliding seat member having a cylindrically concave face engageable with the complementary to the outer face of the slide valve member, each sliding seat member including a guide plug portion which is mounted in the slidable lengthwise of one of the inlet openings and an enlarged head slidably mounted in the central cavity, the cylindrically concave face being the inner face of said head, there being a port in each sliding seat member providing communication between the inlet opening associated therewith and the inlet slot means in the slide valve, means for introducing fluids under pressure into the inlet lines, means for reciprocating and turning the slide valve to bring selected portions of the inlet slot means into registry with the ports, whereby the fluids flow into the interior of the slide valve member and mix therein, and means for withdrawing mixed fluids from the interior of the slide valve member.

7. A mixing valve as in claim 6 wherein a circumferential sealing ring is mounted on each guide plug portion engaging the associated inlet opening to form a sliding seat therebetween.

8. A mixing valve as in claim 6 wherein an end portion of the slide valve member has an axial bore and an axial pin is mounted in the housing extending into the central cavity thereof, the pin being received in the axial bore to guide the slide valve member as it reciprocates and turns.

9. A mixing valve which comprises a housing having a central cavity, a hollow cylindrical slide valve member mounted in said central cavity for reciprocation axially and for turning about the axis thereof, there being radial inlet slot means in said slide valve member, a plurality of transverse inlet openings in said housing communicating with said central cavity, a sliding seat member slidably mounted in each of said inlet openings, each sliding seat member including a guide plug portion which is mounted in and slidable lengthwise of one of the inlet openings and an enlarged head slidably mounted in the central cavity, an annular seal ring surrounding each sliding seat member and engaging the interior of the inlet opening in which the sliding seat member is mounted to form a seal therebetween, each sliding seat member having a cylindrically concave face engageable with and complementary to the outer face of the slide valve member, there being a port in each sliding seat member providing communication between the inlet opening associated therewith and the inlet slot means in the slide valve member, means for introducing liquids under pressure into the inlet cavities, the pressure in the inlet cavities urging the sliding seat members into engagement with the slide valve member, means for reciprocating and turning the slide valve member to bring selected portions of the inlet slot means into registry with the ports, whereby the liquids flow into the interior of the slide valve member and mix therein, and means for withdrawing mixed liquids from the interior of the slide valve member.

10. A mixing valve as in claim 9 wherein each of the annular seal rings is mounted in a circumferential slot in the sliding seat member and extends outwardly therefrom into sliding sealing engagement with the interior of the inlet opening in which the sliding seat member is mounted.

11. A valve comprising: an outer casing having a pair of inlets, at least one outlet, and a cup-shaped recess formed therein; a valve chamber cartridge removably received in said recess, said cartridge including a body having a pair of end surfaces, a valve chamber in said body extending from one of said end surfaces, a pair of inlet passages in said body each having one end communicating with said valve chamber and its other end communicating with an exterior surface of said body; ports in said casing connecting each of said inlet passages with one of said pair of inlets; a slide valve member received in said valve chamber operable to control communication between said pair of inlets and said outlet through said inlet passages; a return port in said outer casing; a second, spray outlet in said outer casing; and an auxiliary passage formed in said body for conducting flow between said return port and said spray outlet; said auxiliary passage extending between the end surfaces of said cartridge body and being unconnected with said inlet passages and said valve chamber.

12. A valve comprising: an outer casing having a pair of inlets, at least one outlet, and a cup-shaped recess formed therein; a valve chamber cartridge removably received in said recess, said cartridge including a body having a pair of end surfaces, a valve chamber in said body extending from one of said end surfaces, a pair of inlet passages in said body each having one end communicating with an exterior surface of said body; ports in said casing connecting each of said inlet passages with one of said pair of inlets; a slide valve member received in said valve chamber operable to control communication between said pair of inlets and said outlet through said inlet passages; said casing being formed with a tub outlet and a shower outlet in communication with each other; and at least one auxiliary passage in said body for conducting flow to said tub and shower outlets from said inlets.

13. A valve as claimed in claim 12 wherein said auxiliary passage extends between the end surfaces of said body and is unconnected with said inlet passages and said valve chamber.

14. A valve as claimed in claim 12 wherein a pair of auxiliary passages are formed in said body; and each of said auxiliary passages extends between the end surfaces of said body and is unconnected with said inlet passages and said valve chamber.

15. A valve as claimed in claim 14 further including a locating member projecting from one of said auxiliary passages, and a port in said recess for receiving said locating member to orient said cartridge in said recess and connect said one auxiliary passage with said tub and shower outlets.

16. A valve comprising: an outer casing having a pair of inlets, at least one outlet, and a cup-shaped recess formed therein; a valve chamber cartridge removably received in said recess, said cartridge including a body having a pair of end surfaces, a valve chamber in said body extending from one of said end surfaces, a pair of inlet passages in said body each having one end communicating with an exterior surface of said body; ports in said casing connecting each of said inlet passages with one of said pair of inlets; a slide valve member received in said valve chamber operable to control communication between said pair of inlets and said outlet through said inlet passages; said valve member comprising a slide valve member rotatable in said valve chamber to vary the proportionate amount of flow from each inlet passage, and axially slidable in said valve chamber to vary the total amount of flow from the inlet passages; a spool member received in said outer casing with an end face engaged with said one end surface of said body; an operating member connected with said slide valve member and mounted in said spool member for axially slidable and rotatable movement relative to said spool member to respectively cause axially slidable and rotatable movement of said slide valve member in said valve chamber; an axial chamber in said spool member communicating with the valve chamber in said body; slot means in said spool member providing communication between said axial chamber and said outlet; means defining a valve seat in said axial chamber; a valve head on said operating member movable between open and closed positions relative to said valve seat upon axial movement of said operating member for controlling flow from said axial member through said slots; said slot means comprising a circumferential slot in said spool member, and radial slots in said spool member connecting said axial chamber with said circumferential slot; said outlet comprising a port communicating with said circumferential slot, a second circumferential slot spaced from said first named circumferential slot to define a rib therebetween; and a return, spray port in said casing communicating with said second slot.

17. A valve as claimed in claim 16 further including a second, spray outlet in said casing; and an auxiliary passage in said body providing communication between said second slot and said second outlet.

18. A valve comprising: an outer casing having a pair of inlets, at least one outlet, and a cup-shaped recess formed therein; a valve chamber cartridge removably received in said recess, said cartridge including a body having a pair of end surfaces, a valve chamber in said body extending from one of said end surfaces, a pair of inlet passages in said body each having one end communicating with said valve chamber and its other end communicating with an exterior surface of said body; ports in said casing connecting each of said inlet passages with one of said pair of inlets; a slide valve member received in said valve chamber operable to control communication between said pair of inlets and said outlet through said inlet passages; said valve member comprising a slide valve member rotatable in said valve chamber to vary the proportionate amount of flow from each inlet passage, and axially slidable in said valve chamber to vary the total amount of flow from the inlet passages; a spool member received in said outer casing with an end face engaged with said one end surface of said body; an operating member connected with said slide valve member and mounted in said spool member for axially slidable and rotatable movement relative to said spool member to respectively cause axially slidable and rotatable movement of said slide valve member in said valve chamber; an axial chamber in said spool member communicating with the valve chamber in said body; slot means in said spool member providing communication between said axial chamber and said outlet; means defining a valve seat in said axial chamber; a valve head on said operating member movable between open and closed positions relative to said valve seat upon axial movement of said operating member for controlling flow from said axial chamber through said slots; said outlet being located in said casing on the opposite side of said body from said one end surface; and an auxiliary passage in said body between said end surfaces providing communication between said slot means and said outlet.

19. A valve as claimed in claim 18 further including an end wall in said recess and wherein the other end surface of said body is seated against said end wall, a port in said end wall communicating with said outlet, and locating means projecting from said body for engaging said port to locate said body in said recess with said auxiliary passage in registry with said port.

20. A valve comprising: an outer casing having a pair of inlets, at least one outlet, and a cup-shaped recess formed therein; a valve chamber cartridge removably received in said recess, said cartridge including a body having a pair of end surfaces, a valve chamber in said body extending from one of said end surfaces, a pair of inlet passages in said body each having one end communicating with said valve chamber and its other end communicating with an exterior surface of body; ports in said casing connecting each of said inlet passages with one of said pair of inlets; and a slide valve member received in said valve chamber operable to control communication between said pair of inlets and said outlet through said inlet passages; said valve member comprising a slide valve member rotatable in said valve chamber to vary the proportionate amount of flow from each inlet passage, and axially slidable in said valve chamber to vary the total amount of flow from the inlet passages; a spool member received in said outer casing with an end face engaged with said one end surface of said body; an operating member connected with said slide valve member and mounted in said spool member for axially slidable and rotatable movement relative to said spool member to respectively cause axially slidable and rotatable movement of said slide valve member in said valve chamber; an axial chamber in said spool member communicating with the valve chamber in said body; slot means in said spool member providing communication between said axial chamber and said outlet; means defining a valve seat in said axial chamber; a valve head on said operating member movable between open and closed positions relative to said valve seat upon axial movement of said operating member for controlling flow from said axial chamber through said slots; said casing being formed with a tub outlet and a shower outlet, and further including a plurality of auxiliary passages in said body extending between the end surfaces of said body and unconnected with said cavity and inlet passages for providing communication between said slot means and said tub and shower outlets.

21. A valve as claimed in claim 20 further including a packing chamber in said spool member surrounding said operating member, and an adjustment member rotatably mounted on said spool member for selectively varying the volume of the packing chamber.

22. A valve as claimed in claim 21 further including means for selectively connecting said adjustment member with said operating member to thereby vary the volume of the packing chamber upon rotation of the operating member.

23. A valve as claimed in claim 22 wherein said last named means includes a disk having an opening slidably receiving said operating member, said disk being rotatable with said operating member.

* * * * *

UNITED STATES PATENT OFFICE
CERTIFICATE OF CORRECTION

Patent No. 3,643,697　　　　　　　　　Dated February 22, 1972

Inventor(s)　　Aaron A. Staat and Robert A. Staat

It is certified that error appears in the above-identified patent and that said Letters Patent are hereby corrected as shown below:

Column 12, line 40, "the" (first occurrence) should be -- and --.

Column 12, line 42, "the" (first occurrence) should be -- and --.

Column 14, line 23, "member" should be -- chamber --.

Signed and sealed this 8th day of August 1972.

(SEAL)
Attest:

EDWARD M. FLETCHER, JR.　　　　ROBERT GOTTSCHALK
Attesting Officer　　　　　　　Commissioner of Patents